United States Patent
Roesner

(10) Patent No.: US 7,026,936 B2
(45) Date of Patent: Apr. 11, 2006

(54) DISTRIBUTED RF COUPLED SYSTEM

(75) Inventor: Bruce B. Roesner, San Diego, CA (US)

(73) Assignee: ID Solutions, Inc., Taipei (TW)

( * ) Notice: Subject to any disclaimer, the term of this patent is extended or adjusted under 35 U.S.C. 154(b) by 68 days.

(21) Appl. No.: 10/676,226

(22) Filed: Sep. 30, 2003

(65) Prior Publication Data
US 2005/0068179 A1 Mar. 31, 2005

(51) Int. Cl.
G08B 13/14 (2006.01)
(52) U.S. Cl. ............... 340/572.4; 340/572.1; 340/505; 340/531; 340/533
(58) Field of Classification Search ......... 340/505, 340/506, 517, 521, 531, 533, 538, 539.1, 340/572.1, 575.7, 572.8, 310.01, 825.36; 345/211
See application file for complete search history.

(56) References Cited

U.S. PATENT DOCUMENTS

| | | | | |
|---|---|---|---|---|
| 4,135,181 A | * | 1/1979 | Bogacki et al. | 340/310.01 |
| 4,287,515 A | * | 9/1981 | Raber et al. | 340/584 |
| 4,394,655 A | * | 7/1983 | Wynne et al. | 340/825.36 |
| 4,742,335 A | * | 5/1988 | Vogt | 340/518 |
| 6,266,052 B1 | * | 7/2001 | Kayser et al. | 345/211 |
| 6,456,481 B1 | * | 9/2002 | Stevenson | 361/302 |
| 6,714,133 B1 | * | 3/2004 | Hum et al. | 340/573.4 |

* cited by examiner

Primary Examiner—Van T. Trieu
(74) Attorney, Agent, or Firm—Fish & Richardson P.C.

(57) ABSTRACT

An RFID sensor system and method is disclosed. An RFID sensor system includes a conducting path having first and second conductors, and one or more RFID sensing transceivers spatially-distributed along the conducting path and capacitively-coupled to the first and second conductors. The system further includes a controller that provides an AC signal on the conducting path, and receives signals from the one or more RFID sensing transceivers. The conducting path and RFID sensing transceivers can formed in a flexible substrate and mated together.

24 Claims, 4 Drawing Sheets (A)            (B)

DISTRIBUTED RF COUPLED SYSTEM

BACKGROUND

The following description relates to a distributed radio frequency identification system and method.

Radio frequency identification (RFID) systems are known and are useful for remote identification of physical objects. The identifier is also referred to as a "transponder" or tag. In most applications, the RFID transponder is in the form of an integrated circuit chip that in its barest form is a silicon die sawed from a silicon wafer attached to the conductive pattern of a substrate. The RFID transponder can have built-in sensors, either within the chip or on the substrate, for sensing or perceiving a stimulus, and transmit a signal based on such sensory operation. The sensors can be analog sensors for perceiving, among many stimuli, pressure, light, temperature, touch, chemical composition, biological composition, etc. The RFID tag transmits signals wirelessly via a radio frequency channel to a central reader.

FIG. 1 illustrates a conventional RFID reader system for receiving signals from one or more RFID sensing tags that may be spatially distributed about an area. The RFID reader system typically includes an RFID reader 102 connected to a number of antennas 104 via cables 106, through which power and data signals are transmitted. Such a configuration may require many expensive cables 106 and antennas 104, especially for interrogating a large number of widely-distributed RFID sensors.

The antennas 104 within an RFID sensor system, or among systems, are tuned specifically for their environment and may add complexity to the system as a whole. Radio frequency transmissions are also usually limited to only a small number of specific carrier signal frequency bands, and the carrier signal is tightly controlled so as to not transmit sideband signals.

These and other aspects of conventional RFID systems can be costly. Several keys to the future proliferation of the deployment of RFID systems lies in reducing the price and complexity of the RFID components and systems.

SUMMARY

This document discloses an RFID sensor system and device for receiving signals from one or more spatially-distributed RFID sensing transceivers. These transceivers are a subcomponent of an RFID tag, and can include an RFID chip and non-tuned conductive substrate.

An RFID sensor system having one or more spatially-distributed RFID sensing transceivers includes first and second conductive paths, for receiving sensing signals from the one or more RFID sensing transceivers. The system further includes a controller for providing a carrier signal on the first and second conductive paths, and for receiving the signals from the first and second conductive paths.

In another embodiment, an RFID sensor system includes a conducting path having first and second conductors, and one or more RFID sensing transceivers spatially-distributed along the conducting path and capacitively-coupled to the first and second conductors. The system further includes a controller coupled to the conducting path. The controller may include an oscillator for providing an AC signal on the conducting path.

In accordance with one method, radio frequency identification of a stimulus includes perceiving the stimulus with at least one RFID sensing transceiver, generating a sensing signal based on the stimulus, capacitively coupling the sensing signal to a conductor, and transmitting the sensing signal on the conductor to a signal reader.

According to another aspect, a system includes multiple passive RFID transceivers, each including a sensor, conductors located in proximity to the passive RFID transceivers and allowing capacitance coupling between the conductors and the passive RFID transceivers, and a controller coupled with the conductors to effect the capacitance coupling, power the passive RFID transceivers, and receive obtained sensor data from the passive RFID transceivers. Each of the passive RFID transceivers can be an RFID chip-attachment module and an integrated circuit (IC) chip comprising the sensor, and the conductors can be located in proximity to the RFID chip-attachment modules. The conductors can be first and second conductive leads. An antenna can be coupled with one of the first and second conductive leads to allow RF transmissions with an external reader.

One or more of the following advantages may be provided. The systems and techniques described may result in considerable system flexibility while also eliminating many of the costly components associated with a standard system. The system can greatly simplify and reduce the cost of an RFID sensor system. A traditional RFID reader can be replaced with a much less costly controller, and the system can be used in new applications that might otherwise be expensive or problematic. The RFID sensor system described can be used in monitoring various nodes on a printed circuit board or within a larger system, such as an automobile. The number of sensing transceivers that can be deployed may be essentially unlimited. Moreover, an enhancement of the system described allows for external communication onto a common bus line using RF transmission through an antenna.

Instead of having multiple styles of tag antennas, each of which should tuned for its environment, one standard module independent of frequency and of the medium to which it is attached can be used. The cost of a standard module can be much less than the various RFID tags. Each module along with its sensor can be pre-tested prior to attachment onto a system. The described system can utilize a carrier signal conducted on a hard wire, thus there need not be RF transmission, which are typically subject to many governmental regulations, compliance with which can increase system costs. Modules can be added, or replaced, simply by placing the modules in close proximity to the conductors. Moreover, the attachment can be easily accomplished, such as by using pressure sensitive adhesives.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to a distributed RF-coupled RFID system that uses significantly fewer components while offering greater flexibility than conventional RFID sensor systems.

Figure 1:
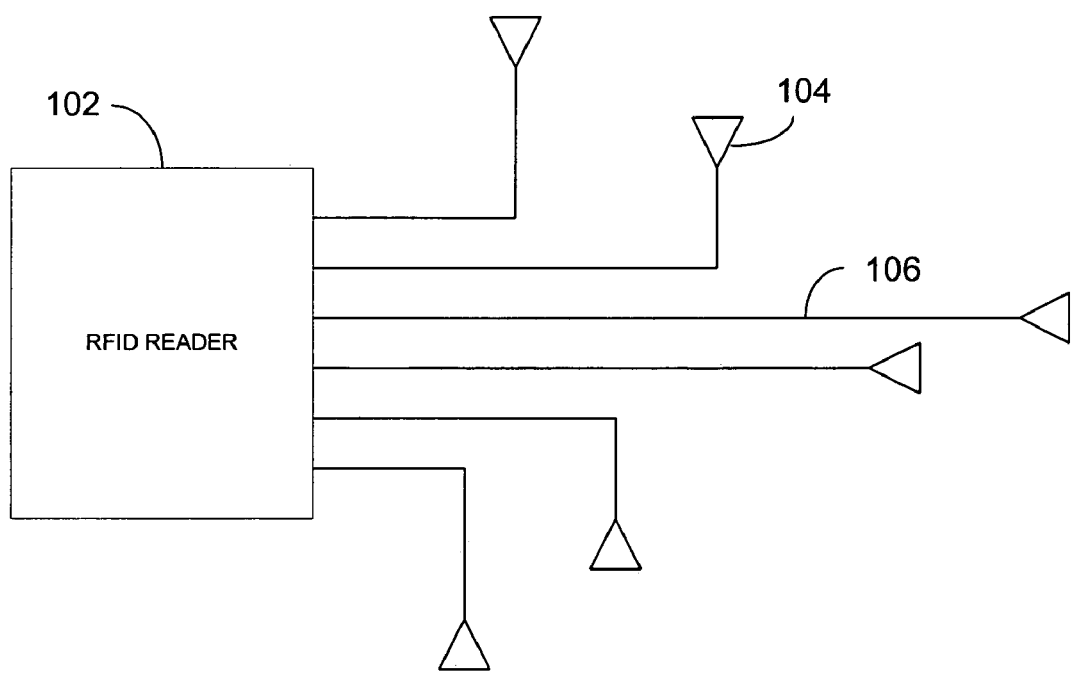
FIG. 1 illustrates a conventional RFID tag reader system employing a network of antennas and transmission cables.
Figure 2:
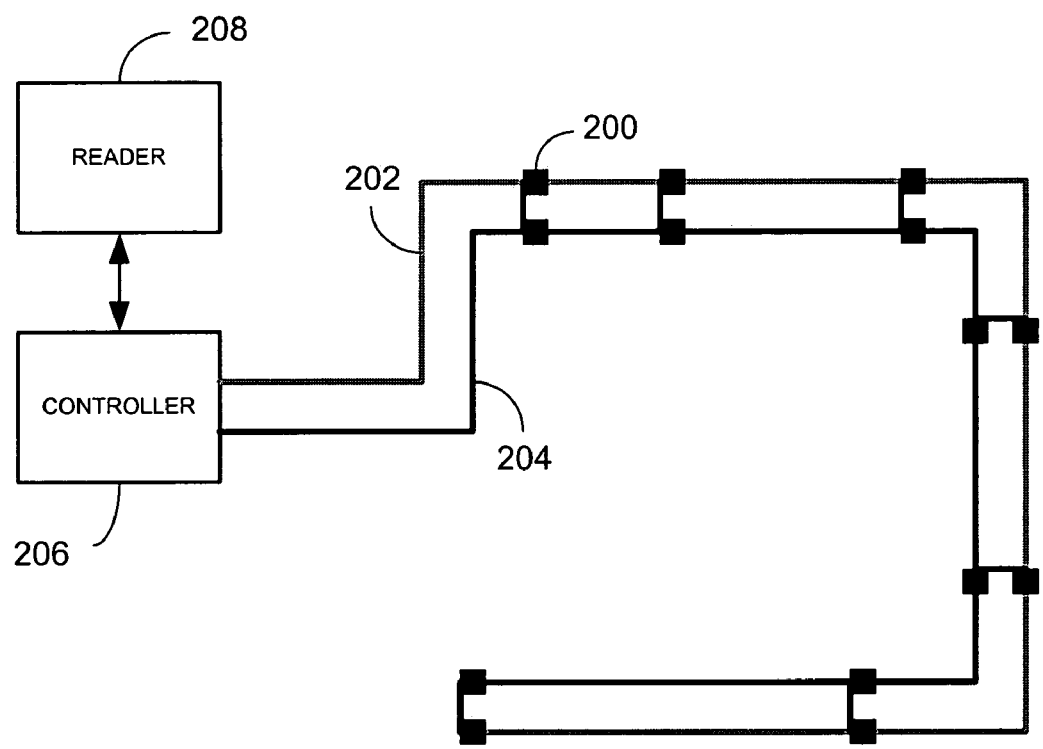
FIG. 2 is a block diagram of an RFID sensor system having one or more spatially-distributed RFID sensing transceivers.

FIG. 2 shows an RFID sensor system for receiving signals from one or more RFID sensing transceivers 200 that are spatially distributed about an area. The RFID sensing transceivers 200 are adapted to provide a sensing signal in response to a detected stimulus, based on such stimuli as pressure, light, temperature, touch, chemical composition, biological composition, or changes thereof. The RFID sensing transceivers 200 may be adapted to detect other types of stimuli or multiple types of stimuli.

The RFID sensor system includes a first conductive path 202 and a second conductive path 204. The first and second conductive paths 202 and 204 can be capacitively coupled to the RFID sensing transceivers, but may also be directly coupled. The conductive paths 202, 204 may be made from copper or silver conductive paste attached to a substrate. Each conductive path 202, 204 conducts a carrier signal that both powers the RIFD sensing transceivers 200 and carries sensing signals received from the RFID sensing transceivers 200 via the capacitive-coupling. In one example, the first and second conductive paths 202 and 204 each have a width of 1–10 mils, are substantially parallel to each other, and are spaced apart by 1–10 mils. Other dimensions and arrangements may be used. Upon detection of a stimuli, an RFID sensing transceiver 200 can capacitively couple a sensing signal onto the conductive paths 202 and 204 for transmission by the carrier signal.

The RFID sensor system further includes a controller 206 that provides the carrier signal to the conductive paths 202 and 204. The controller 206 is also configured to receive the sensing signals from the first and second conductive paths 202, 204 on the carrier signal. The controller 206 may include an oscillator 210 for generating an AC signal that is used for the carrier signal. Other mechanisms for generating the carrier signal may also be employed. The carrier signal may be a low frequency signal, such as 50–100 MHz, and thereby not require accurate or substantial control. However, higher or lower frequencies may be used for the carrier signals. Accordingly, those having skill in the art would recognize that the controller 206 and the carrier signal can be configured to operate in a wide range of frequencies. Using direct coupling, a DC signal can also be used.

The RFID sensor system further includes a reader 208 coupled to receive sensing signals from the RFID sensing transceivers 200 via the conductive paths 202, 204 and the controller 206. In one example the reader 208 is connected to the controller 206. The reader 208 includes logic 212 configured to receive the sensing signals and resolve an output based on the sensing signals. The logic 212 may be embodied in hardware, software or firmware, or any combination thereof. The logic 212 may include a microprocessor executing instructions for reading the sensing signals and resolving an output based on the sensing signals. The logic 212 may be responsive and reconfigurable based on input signals from an input interface. The logic 212 may include one or more logic circuits. Those having skill in the art would recognize that the logic 212 may be implemented in any number of ways, and therefore not limited to a particular logic mechanism or technique. Moreover, the controller 206 and the reader 208 may be integrated into a single device, which may be considered a controller of the RFID sensor system.

Figure 3:
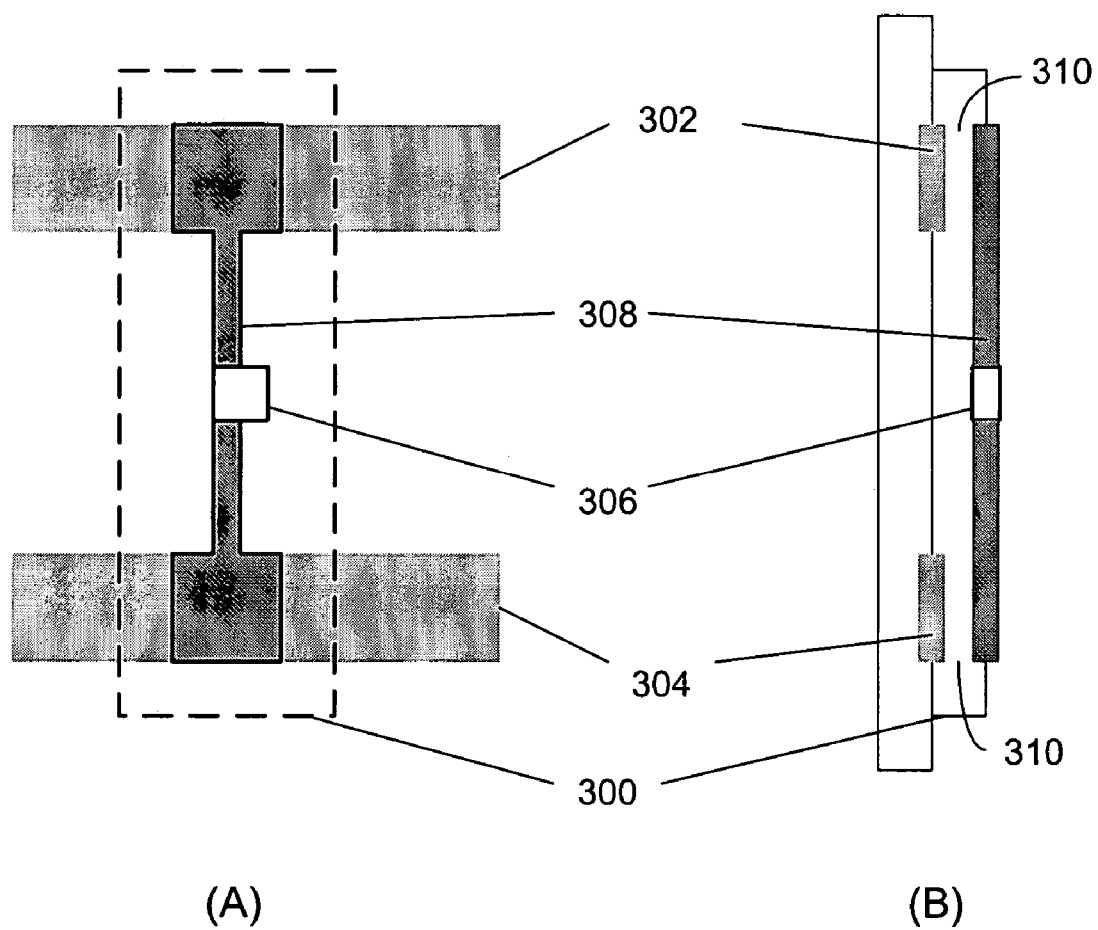
FIG. 3(A) is a top-down view of a RFID sensing transceiver capacitively-coupled to a conducting path.
FIG. 3(B) is a side view of a RFID sensing transceiver capacitively-coupled to a conducting path.

FIGS. 3A and 3B show various views of an example RFID sensing transceiver 300 disposed with a first conductive path 302 and a second conductive path 304. Each RFID sensing transceiver 300 may include an RFID chip 306 coupled to a chip attachment module 308. The chip attachment module 308 serves to receive power signals from the first and second conductive paths 302, 304, as well as to supply a sensing signal based on a stimulus sensed by the RFID chip 306. In an RFID tag, the chip 306 can be attached to the chip attachment module 308 to form an RFID transceiver that can then be attached to a tuned antenna to form the FRID tag; the tuned module is then limited to a very narrow frequency range in which the system can operate. In contrast, the RFID transceiver 300 can be connected to conductive leads to form the distributed network described, and the frequency transmitted along the conductive leads can cover a wide range of frequencies. The chip attachment module 308 can be shaped so as to form one conductor of a capacitive coupling 310 that couples the RFID sensing transceiver 300 to the first conductive path 302 and/or second conductive path 304, allowing communication signals to cover a wide range of frequencies.

As shown in FIG. 3B, the first and second conductive paths 302 and 304 may be formed in a first substrate or layer, and the RFID sensing transceiver 300 may be formed in a second substrate or layer overlaid with the first substrate or layer. Various techniques may be used to form the first and second substrates or layers. The layers may be mated together from separate reels of the layers. Alternatively, the RFID sensing transceivers 300 may be mated individually to the conductive path layer. The substrate on which the conductors and/or RFID sensing transceivers are formed can be made of a thin flexible substrate material such as polyethylene terephthalate (PET) (i.e. Mylar™) or other suitable material. The substrate(s) can be mated together for either capactive or direct coupling of the conductive paths 302 and 304 with the RFID sensing transceiver 300.

Figure 4:
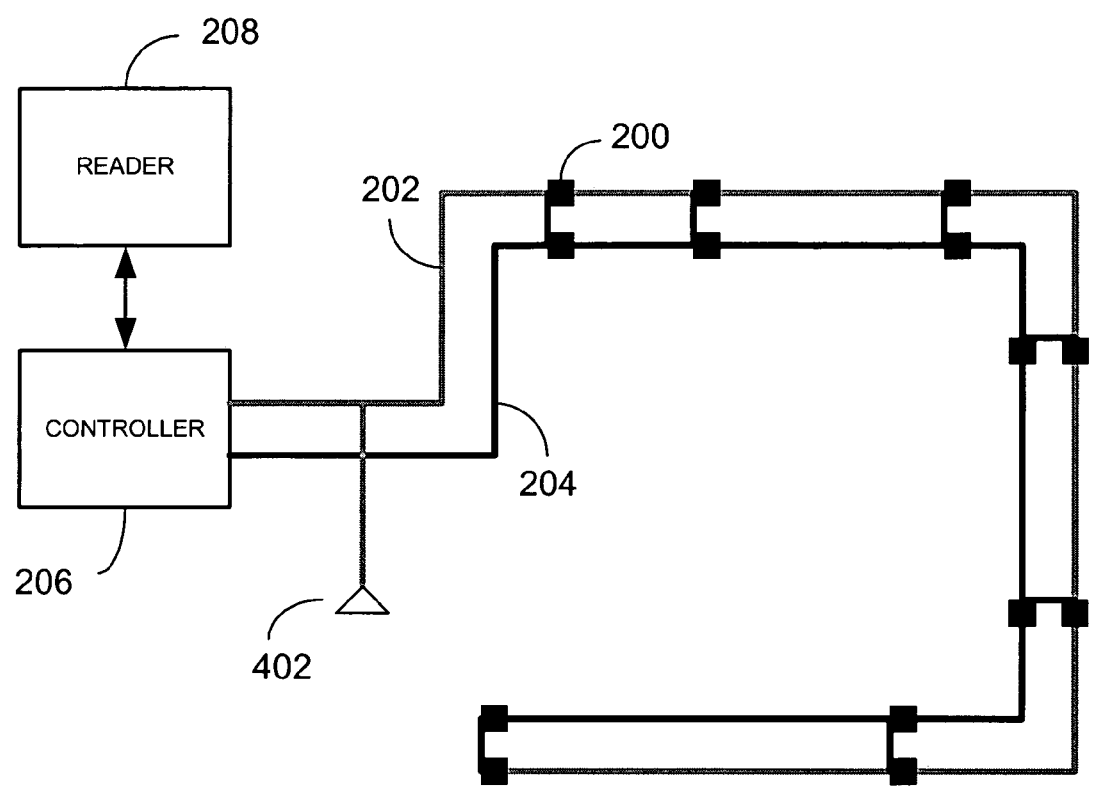
FIG. 4 is a block diagram of an RFID sensor system including an antenna coupled to the conducting path.

FIG. 4 shows an alternative RFID sensing system, including an antenna 402 for receiving radio frequency signals from a remote or uncoupled RFID sensing transceiver, or other radio frequency signal source. The antenna 402 may be connected to one of the conductive paths 202 or 204. Accordingly, the connected conductive path 402, controller 206 and reader 208 may receive sensing signals from multiple sources at various different frequencies or signal strengths.

Although a few embodiments have been described in detail above, other modifications are possible. Other embodiments may be within the scope of the following claims.

The invention claimed is:

1. A radio frequency identification (RFID) sensor system comprising:
    multiple spatially-distributed RFID sensing transceivers;
    first and second conductive paths, far receiving sensing signals from the RFID sensing transceivers; and
    a controller for providing a carrier signal on the first and second conductive pats, and for receiving the signals from the first and second conductive paths;
    wherein the spatially-distributed RFID sensing transceivers are non-inductively coupled, in parallel, to the first and second conductive paths.

2. The system in accordance with claim 1, wherein the first and second conductive paths are substantially parallel to each other.

3. The system in accordance with claim 1, wherein the controller includes an oscillator for providing an AC signal for the carrier signal.

4. The system in accordance with claim 1, further comprising a reader, in communication with the controller, and having logic for resolving an output based on the sensing signals received from the RFID sensing transceivers.

5. The system in accordance with claim 1, wherein the sensing signals are capacitively-coupled from the RFID sensing transceivers to the first and second conductive paths.

6. The system in accordance with claim 1, wherein the RFID sensing transceivers generate the sensing signals based on a stimulus perceivable by the RFID sensing transceivers.

7. The system in accordance with claim 6, wherein the stimulus is selected from the group consisting of: pressure, light, temperature, touch, chemical composition, or biological composition.

8. A radio frequency identification (RFID) sensor system, comprising:
    a conducting path having first and second conductors; and
    one or more RFID sensing transceivers spatially-distributed along the conducting path and capacitively-coupled to the first and second conductors; and
    a controller coupled to the conducting path.

9. The system in accordance with claim 8, wherein the controller includes an oscillator.

10. The system in accordance with claim 9, wherein the oscillator is configured to provide a carrier signal on the conducting path.

11. The system in accordance with claim 8, wherein the one or mare RFID sensing transceivers are each configured to perceive a stimulus, and provide a sensing signal to the conductive path via the capacitive coupling based on the stimulus perceived by the RFID sensing transceiver.

12. The system in accordance with claim 11, wherein the controller is configured to receive the sensing signal from an RFID sensing transceiver via the first and second conductive paths.

13. The system in accordance with claim 11, wherein the stimulus is one from the group consisting of: pressure, light, temperature, touch, chemical composition, or biological composition.

14. The system in accordance with claim 8, wherein the first and second conductors are substantially parallel to each other.

15. A method for radio frequency identification of a stimulus, comprising:
    perceiving the stimulus with at least one RFID sensing transceiver;
    generating a sensing signal based on the stimulus;
    capacitively coupling the sensing signal to a conductor; and
    transmitting the sensing signal on the conductor to a signal reader.

16. The method in accordance with claim 15, wherein the conductor includes a first conductive pat and a second conductive path capacitively coupled to the at least one RFID sensing transceiver.

17. The method in accordance with claim 16, further comprising:
    providing a carrier signal to the conductor; and
    transmitting the sensing signal on the carrier signal.

18. The method in accordance with claim 17, wherein the carrier signal includes a frequency between 50 and 100 MHz.

19. The method in accordance with claim 15, further comprising resolving an output with the signal reader.

20. A system comprising:
    multiple passive radio frequency identification (RFID) transceivers, each comprising a sensor;
    conductors located in proximity to the passive RFID transceivers and allowing capacitance coupling between the conductors and the passive RFID transceivers; and
    a controller coupled with the conductors to effect the capacitance coupling, power the passive RFID transceivers, and receive obtained sensor data from to passive RFID transceivers.

21. The system of claim 20, wherein each of the passive RFID transceivers comprises an RFID chip-attachment module and an integrated circuit (IC) chip comprising the sensor, and the conductors are located in proximity to the RFID chip-attachment modules.

22. The system of claim 21, wherein the conductors comprise first and second conductive leads.

23. The system of claim 22, further comprising at least one antenna coupled with at least one of the first and second conductive leads to allow RF transmissions with at least one external reader.

24. The system of claim 22, further comprising a printed circuit board including nodes monitored by the sensors.

* * * * *